US008878140B2

(12) United States Patent
Akers et al.

(10) Patent No.: US 8,878,140 B2
(45) Date of Patent: Nov. 4, 2014

(54) METHODS FOR RADIATION DETECTION AND CHARACTERIZATION USING A MULTIPLE DETECTOR PROBE

(75) Inventors: Douglas William Akers, Idaho Falls, ID (US); Lyle Gene Roybal, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 1388 days.

(21) Appl. No.: 12/608,775

(22) Filed: Oct. 29, 2009

(65) Prior Publication Data

US 2014/0299757 A1     Oct. 9, 2014

(51) Int. Cl.
*G01J 1/42*     (2006.01)
*G01V 5/04*     (2006.01)

(52) U.S. Cl.
USPC ........... 250/395; 250/394; 250/393; 250/252; 250/253

(58) Field of Classification Search
CPC ........ G01V 5/06; G01V 5/0075; G01V 5/145
USPC .......................... 250/395, 394, 393, 252, 253
See application file for complete search history.

(56) References Cited

U.S. PATENT DOCUMENTS

| | | | | |
|---|---|---|---|---|
| 2,745,970 | A | * | 5/1956 | Dewan ........................ 250/269.6 |
| 2,755,390 | A | * | 7/1956 | Teichmann ................. 250/269.5 |
| 3,842,264 | A | * | 10/1974 | Arnold et al. ................. 250/264 |
| 3,988,581 | A | * | 10/1976 | Peelman et al. ............... 376/165 |
| 4,267,446 | A | * | 5/1981 | Brown et al. ................. 250/255 |
| 4,297,575 | A | * | 10/1981 | Smith et al. ................... 250/265 |
| 4,879,463 | A | * | 11/1989 | Wraight et al. ............ 250/269.2 |
| 5,679,956 | A | * | 10/1997 | Johnston ..................... 250/357.1 |
| 5,773,829 | A | | 6/1998 | Iwanczyk et al. |
| 6,528,797 | B1 | | 3/2003 | Benke et al. |
| 7,095,030 | B2 | | 8/2006 | Hughes et al. |
| 2003/0136916 | A1 | * | 7/2003 | Kearfott et al. ............... 250/393 |
| 2007/0241275 | A1 | * | 10/2007 | Guo et al. ................... 250/269.1 |
| 2007/0257189 | A1 | * | 11/2007 | Ogura et al. ................. 250/253 |
| 2009/0224160 | A1 | * | 9/2009 | Roybal ..................... 250/363.09 |

FOREIGN PATENT DOCUMENTS

JP          63139284     *  6/1988   ............... G01V 5/00

* cited by examiner

*Primary Examiner* — Tarifur Chowdhury
*Assistant Examiner* — Sunghee Y Gray
(74) *Attorney, Agent, or Firm* — TraskBritt (57) ABSTRACT

Apparatuses, methods, and systems relating to radiological characterization of environments are disclosed. Multi-detector probes with a plurality of detectors in a common housing may be used to substantially concurrently detect a plurality of different radiation activities and types. Multiple multi-detector probes may be used in a down-hole environment to substantially concurrently detect radioactive activity and contents of a buried waste container. Software may process, analyze, and integrate the data from the different multi-detector probes and the different detector types therein to provide source location and integrated analysis as to the source types and activity in the measured environment. Further, the integrated data may be used to compensate for differential density effects and the effects of radiation shielding materials within the volume being measured.

16 Claims, 6 Drawing Sheets

METHODS FOR RADIATION DETECTION AND CHARACTERIZATION USING A MULTIPLE DETECTOR PROBE

GOVERNMENT RIGHTS

This invention was made with government support under Contract Number DE-AC07-05ID14517 awarded by the United States Department of Energy. The government has certain rights in the invention.

TECHNICAL FIELD

Embodiments of the present invention relate generally to material detection and characterization of an environment, and more specifically, to apparatuses and methods of operating a material detection and characterization system.

BACKGROUND

There is a well-recognized need for environmental remediation, or cleanup, of contaminants that exist in a variety of settings. For example, radioactive waste and other contaminants from a variety of reactor experiments have been previously disposed of in various locations by placing the contaminants in waste containers buried underground. These buried waste containers, such as silos and vertical pipe units (VPUs) contain contaminants that may pose a threat to the environment, and ultimately to the health and safety of all living creatures. Recent efforts have been made to remove and more securely dispose of hazardous waste from such buried waste containers.

During remediation, field operators often may not know of the radiation strength or contents of the buried waste container until after excavation of the buried waste container has already begun. This may make it difficult for field operators to develop a proper remediation plan to ensure efficiency of the clean up as well as provide the proper safeguards for safety in handling the waste during removal. For example, prior efforts to characterize radioactive contents of buried waste containers included uncovering portions of the waste through excavation, partially exposing portions of the buried waste container before knowing anything regarding its contents. With part of the waste container exposed, single detectors, such as a Geiger Mueller detector, have been used to detect the strength of radiation field but without knowing the contents of the container. Once a first set of measurements is taken, prior methods include excavating further and taking additional measurements.

During environmental remediation of radioactive waste sites, there is a need for in-situ characterization of the waste, including obtaining immediate information on the distribution and quantities of radioactive material present. This information may be used to make immediate decisions regarding specific remediation requirements. Further, there is a need to have a system that works in a wide range of radiation environments with the capability to provide synergistic data from a range of sensors on the types and quantities of radioactive material present. Additionally, material detection systems may be operated by persons with limited training. Thus, a system is desired such that untrained operators can easily calibrate and operate the system, and interpret the output of the system for making environmental remediation decisions at waste sites.

BRIEF SUMMARY

An embodiment of the present invention includes a multi-detector probe assembly. The multi-detector probe assembly includes a plurality of detectors for detecting a plurality of radiation forms. The plurality of detectors are housed in a common assembly and configured to substantially concurrently communicate measurement data corresponding to detected radiation forms to a computer. The multi-detector probe assembly further includes at least one shield located on an end of at least one detector of the plurality of detectors. The at least one shield at least partially restricts the sensing range of at least one detector of the plurality of detectors.

Another embodiment of the present invention includes a method for detecting multiple forms of radioactive activity in an environment. The method includes detecting a plurality of radiation types in an environment with a probe including a plurality of detectors. The method further includes sending substantially concurrent measurement data from the plurality of detectors of the probe to a computer.

Yet another embodiment of the present invention includes a radiological characterization system. The radiological characterization system includes a computer and a multi-detector probe connected to the computer. The multi-detector probe includes a plurality of detectors for detecting a plurality of radiation forms. The plurality of detectors are housed in a common assembly and configured to substantially concurrently communicate measurement data corresponding to detected radiation forms to the computer.

DETAILED DESCRIPTION

In the following detailed description, reference is made to the accompanying drawings, which form a part hereof and, in which is shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, functions may be shown in block diagram form in order not to obscure the present invention in unnecessary detail. Furthermore, specific implementations shown and described are only examples and should not be construed as the only way to implement the present invention unless specified otherwise herein. It will be readily apparent to one of ordinary skill in the art that the various embodiments of the present invention may be practiced by numerous other partitioning solutions. For the most part, details concerning timing considerations, and the like, have been omitted where such details are not necessary to obtain a complete understanding of the present invention in its various embodiments and are within the abilities of persons of ordinary skill in the relevant art.

When executed as firmware or software, the instructions for performing the methods and processes described herein may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

Referring in general to the following description and accompanying drawings, various embodiments of the present invention are illustrated to show its structure and method of operation. Common elements of the illustrated embodiments are designated with like numerals. It should be understood that the figures presented are not meant to be illustrative of actual views of any particular portion of the actual structure or method, but are merely idealized representations employed to more clearly and fully depict the present invention defined by the claims below.

Figure 1:
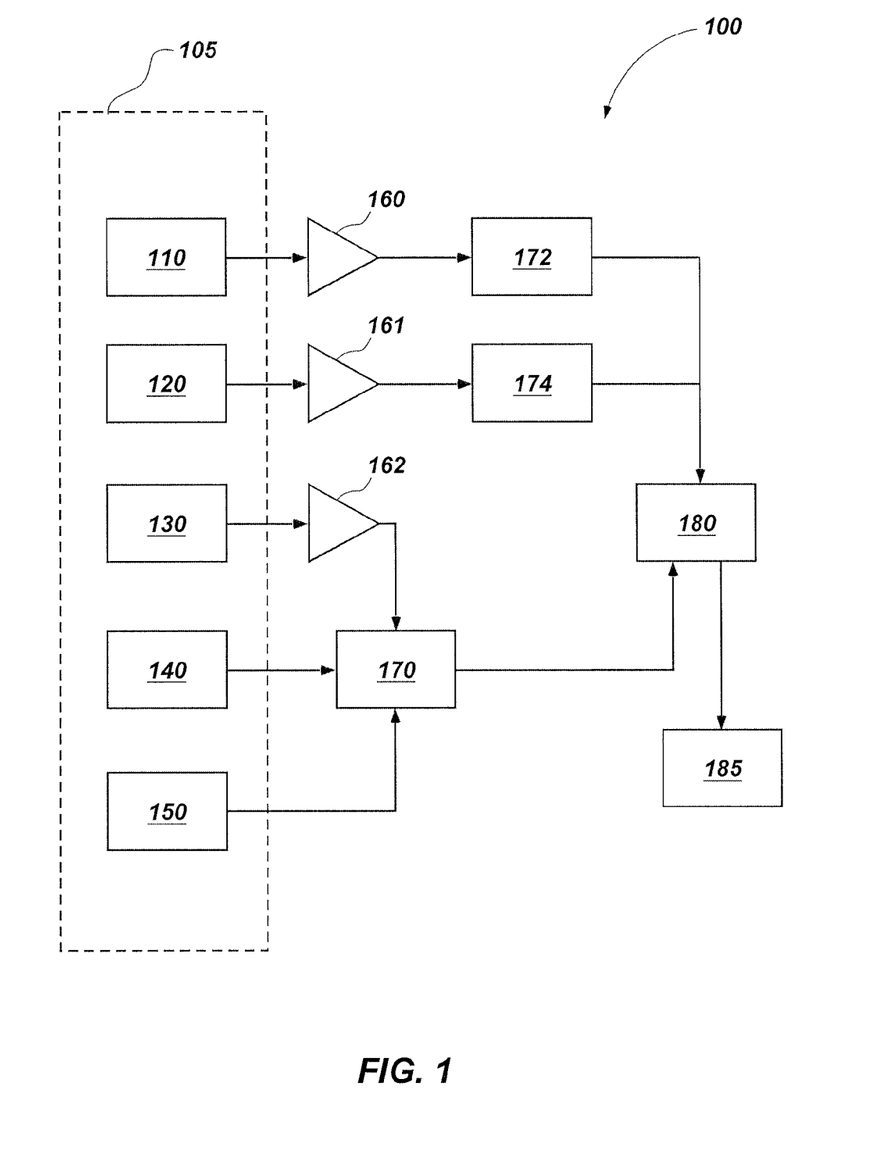
FIG. 1 illustrates a radiological characterization system incorporating a plurality of detectors of radiation according to an embodiment of the present invention.

FIG. 1 illustrates a radiological characterization system 100 incorporating a plurality of detectors of radiation according to an embodiment of the present invention. Radiological characterization system 100 may be used to provide a characterization of, and other information related to, radiological activity and materials in an environment such as a hazardous waste site. Radiological characterization system 100 includes a multi-detector probe assembly 105. Multi-detector probe assembly 105 may include a plurality of detectors 110, 120, 130, 140 and 150. The plurality of detectors 110, 120, 130, 140, 150 may be housed in a common assembly and configured for detecting a plurality of radiation forms. The plurality of detectors may also be configured to substantially concurrently communicate measurement data to the computer 180.

Each detector of the plurality of detectors 110, 120, 130, 140, and 150 may send data to computer 180 through intermediate circuitry such as signal amplifiers 160, 161, 162, analyzers 172, 174, and a pulse counter 170. Computer 180 may include a processor, computer-readable media for data storage, a monitor, as well as other peripheral devices such as printers, speakers, and so forth. Computer 180 may also be connected to an external storage device 185 for redundant data storage.

In operation, the plurality of detectors 110, 120, 130, 140, and 150 may be housed in a common assembly and configured to obtain information regarding a distribution of gamma- and neutron-emitting radionuclides over a broad range of radionuclide activities. This information may be sent to computer 180 for further processing and integrated analysis. For example, measurements by detectors of multi-detector probe assembly 105 may occur through a down-hole environment, wherein a tube is driven into the soil to provide a path for the multi-detector probe assembly 105 to detect activity used to characterize parameters of the environment, such as the activity, location and quantity of a variety of radionuclide content for one or more buried waste containers. Measurement data may also provide an accurate characterization of the distribution and quantity of radionuclides in the soil around and below the buried waste container, including the potential for such to occur. Measurements may also be performed after removal of a hazardous waste container to determine the amount of fissile and other radioactive materials that may have exited from the hazardous waste container. Measurements may be taken in the down-hole environment at specific localized locations or incrementally at depth positions throughout the hole, such as in 1 ft. vertical increments.

By way of example, detectors 110 and 120 may be configured as scintillators, such as gamma spectrometers, to detect isotopic activity. Detectors 110 and 120 may be configured to take isotopic measurements of both low-level and high-level gamma isotopic activity, and send the data signal to their respective amplifiers 160, 161 to boost the signal from the detectors and prepare the signal for processing and storage by computer 180. Amplifiers 160, 161 may require a fast rise time as pulses may be very short. As will be discussed below, the data signal may be received on a local bus of computer 180, such as a peripheral component interconnect (PCI) bus, after digital conversion through analyzers 172, 174.

Analyzers 172, 174 may have a large series of analog to digital channels divided into energy bins. For example, the number of channels may be in the order of 1000 to 4000 channels that range from approximately 70 keV to 1400 keV. However, more or fewer channels or energy ranges may be used. Different gamma rays may enter the radiological characterization system 100. When a gamma ray of a certain energy encounters the detector, a pulse may be created in the detector at a height corresponding to the energy of the gamma ray. This pulse height is measured and categorized by the analyzers 172, 174. Thus, the analyzers 172, 174 create a spectrum of pulse heights created by materials present in the environment as detected by detectors 110, 120, 130, 140, 150 of the multi-detector probe assembly 105. This digital information may be sent to computer 180 for further storage and analysis. This information may be used later to identify the source material emitting the gamma ray as each source material produces a different characteristic gamma ray.

Detector 130 may be configured to detect a general radiation field of gross gamma activity. Detector 130 may take measurements of gross gamma activity within the environment, and send the data signal to its amplifier 162 and to a pulse counter 170 for processing. The pulse counter 170 may be configured to detect a number of gross gamma counts rather than creating a spectrum like the analyzers 172, 174. As discussed later, analyzers 172, 174 and pulse counter 170 may be implemented as one or more PCI cards with multiple input connections for different detectors and in communication with the PCI bus of computer 180 for computer 180. Computer 180 may additionally perform further processing and storage of the data sent by detector 130.

Detectors 140, 150 may be configured as neutron detectors to assess presence of neutron activity from fissile radioactive materials. Detecting the presence of neutrons may indicate that fission activity is currently present within the contaminants, that buried fuel may exist that is active, and that changing the geometry of the buried waste container may result in a spontaneous and uncontrolled fission reaction. This information may give field operators proper notice to take additional precautions before beginning removal and remediation of the waste. Detectors 140 and 150 may further include a preamplifier to prepare its data signal for processing by pulse counter 170 and computer 180. In operation, when a neutron contacts the detectors 140, 150 configured as neutron detectors, gas is discharged within the detectors 140, 150. This gas discharge within the detector produces a pulse. Pre-amplifiers may amplify the signal to be within a range of about 2.4 V to 5 V, or another voltage recognizable by the pulse counter 170. The pulse counter 170 may not differentiate as to the heights of the pulses that the neutron detectors produce, but rather the mere existence of the pulse event. The values associated with the amount and frequency of pulses created by the neutrons meeting with the pulse counter 170 indicates the strength of fissile activity, if any. This digital information may be sent to computer 180 for further storage and analysis.

Detectors may communicate with the computer 180 through a local bus of the computer such as a PCI bus. For example, analyzers 172, 174 may be implemented as part of one or more PCI cards which provide a port for the detectors to communicate with the computer 180. Pulse counter 170 may also be implemented as part of a PCI card connected with the computer 180. The computer 180 may alternatively, have one or more PCI cards formed as an integrated circuit fitted onto the motherboard itself as opposed to a separate card that is designed to fit separately into a PCI expansion slot. Other platforms or buses for connection with computer 180 may also be used, such as, for example, PCI eXtensions for Instrumentation (PXI), a universal serial bus (USB), or through other methods as known in the art.

Data may be received and stored locally within a computer-readable medium of computer 180, such as within a hard disk drive. To protect against potential data loss in the event of hard disk drive failure on computer 180, redundant data storage may also be implemented through data storage on an external storage device 185 connected to computer 180, such as an external hard drive, DVDs, Flash memory, or the like. For example, acquired raw data from detectors, results from analysis of raw data, intermediate data, and integration of data may be stored on external storage device 185 during an automated process within analysis software. Redundant data may be stored continuously or substantially concurrent with data acquisition from the multi-detector probe assembly 105 and processing by the computer 180. Redundant data may be stored automatically on a periodic basis, such as once every 24 hours.

One or more multi-detector probe assemblies 105 may be used to gather more data as part of the characterization of the environment. For example, a plurality of multi-detector assembly probes 105 may be used to surround a buried waste container to store information from different locations around the buried waste container. These measurements from multiple locations may assist in more accurately estimating source location and activity of hazardous materials within the buried waste container. In an exemplary embodiment, an estimation of source location of a certain radionuclide may be accurate to within 2 to 3 feet, however, utilizing more multi-detector assembly probes 105 to gather additional sets of measurements may further decrease the level of error and improve the accuracy of the estimate regarding source location.

Figure 2:
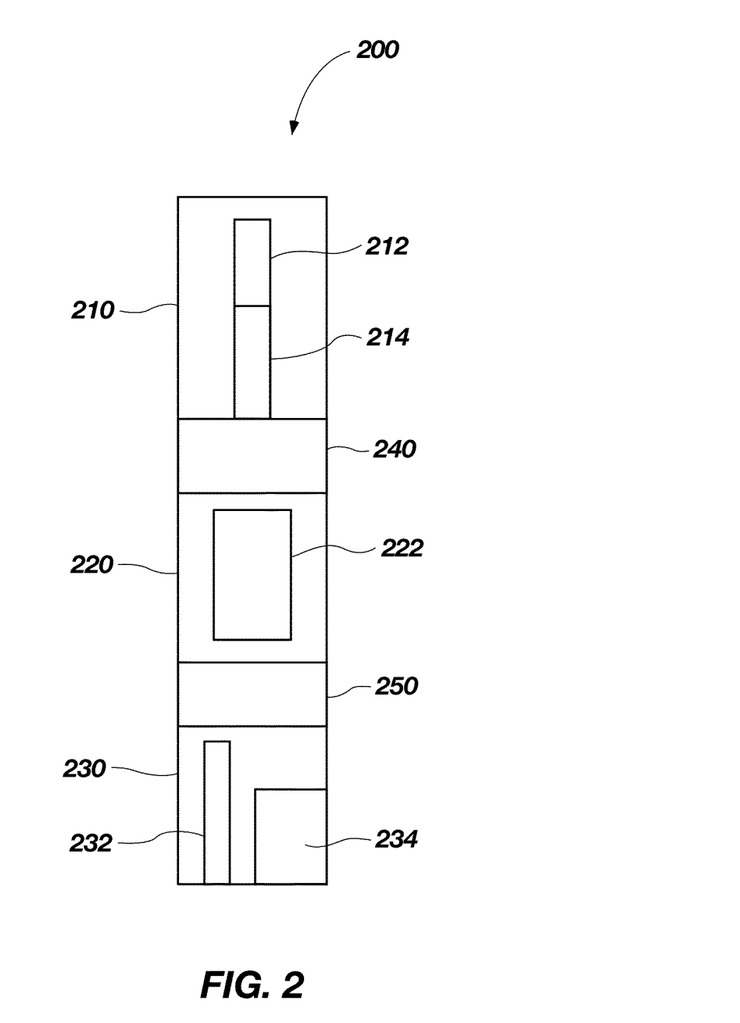
FIG. 2 illustrates a multi-detector probe according to an embodiment of the present invention.

FIG. 2 illustrates a multi-detector probe 200 according to an embodiment of the present invention. Multi-detector probe 200 may have a plurality of detector compartments. Each detector compartment 210, 220, 230 may include one or more detectors. For example, detector compartment 210 may include detectors 212 and 214. Detector compartment 220 may include detector 222. Detector compartment 230 may include detectors 232 and 234. Each detector compartment with its detectors may also be separated from an adjacent detector compartment and their detectors through shielding 240, 250. Thus, multi-detector probe 200 includes a plurality of detectors 212, 214, 222, 232, and 234 housed in a common assembly. The plurality of detectors 212, 214, 222, 232, and 234 may be for detecting a plurality of radiation forms and configured to substantially concurrently communicate measurement data to a computer.

Figure 3:
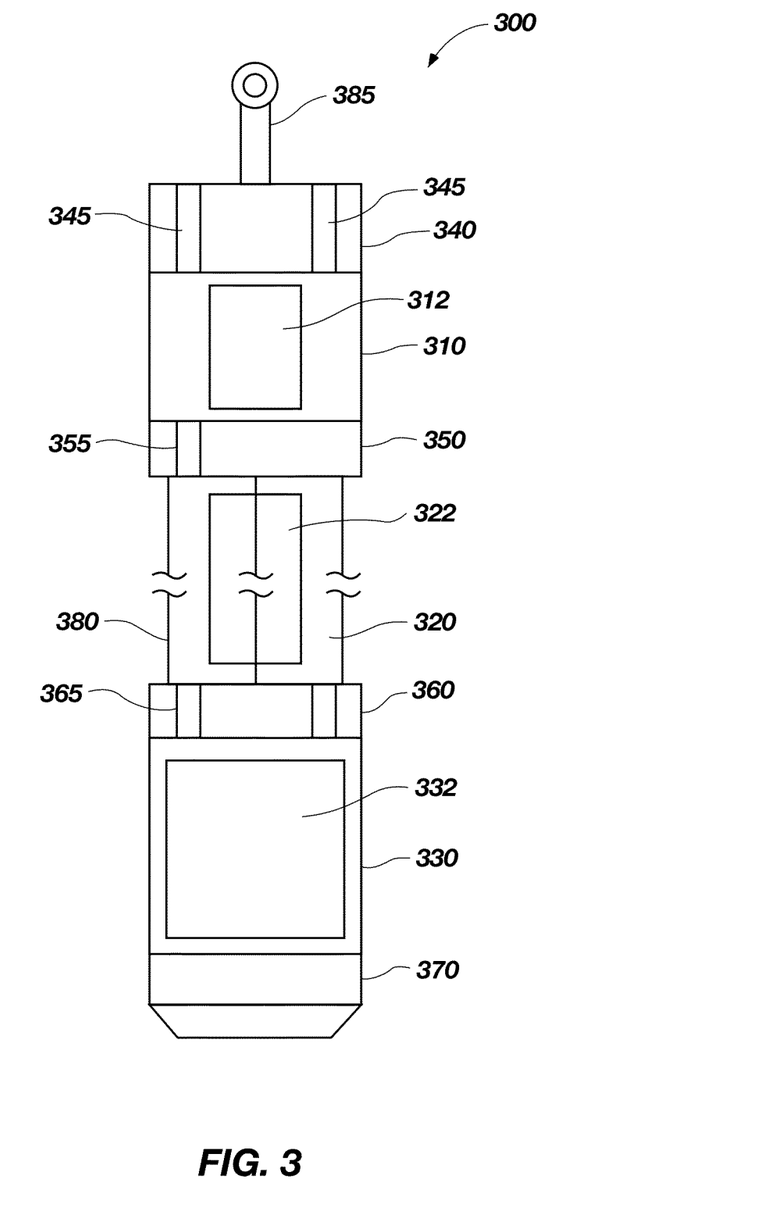
FIG. 3 illustrates a multi-detector probe assembly according to an embodiment of the present invention.

Shielding 240, 250 may be configured to at least partially restrict the sensing range or field of view of at least one of the detectors. Restricting the view of detectors may include causing the detectors to see only in a substantially horizontal plane with respect to the area of the environment being detected. This may improve accuracy and localization of the source position of hazardous material within an environment such as a buried waste container. Other shields (not shown in FIG. 2) may be located at the top or bottom edges of multi-detector probe 200 as is shown in FIG. 3. Shielding 240, 250 may also reduce reflected radiation (i.e., "shine"), which may reflect off background objects, such as the metal structure of the buried waste container itself, where the radiation comes from sources from different angles above and below the radial section of the buried waste container where radiation is to be measured. Shielding 240, 250 may be formed from nearly any material as long as a proper thickness is used to absorb gamma rays; however, a high mass density material such as bismuth, tungsten, or lead may be preferred. The choice of material used for shielding 240, 250 may be dictated by one or more factors, such as cost, hardness, and toxicity of the material.

In operation, multi-detector probe 200 may be used in an environment to detect and characterize an environment for different radionuclide materials and activities. The detectors may be specified and configured to measure a broad range of possible waste radiation types and activity levels that may be present in an environment. For example, detectors may be chosen to include multiple isotopic gamma ray detectors, neutron detectors, and gross gamma radiation detectors. By way of example, and not limitation, detector 212 may be a Boron Trifluoride ($BF_3$) neutron detector and detector 214 may be a Helium-3 ($^3$He) neutron detector. Spontaneous neutron production may occur from Plutonium-239 ($^{239}$Pu), Plutonium-240 ($^{240}$Pu), and Americium-241 ($^{241}$Am). Using $BF_3$ and $^3$He detectors as detectors 212 and 214, respectively, assists in assessing the presence of quantities of fissile radioactive materials that may not be directly detectable using gamma spectrometry methods. $^3$He detectors are much more sensitive to neutrons than $BF_3$ detectors, even to the extent of approximately 150 times more sensitive to neutrons. However, $BF_3$ detectors may be less sensitive to gamma radiation interference and are more suitable for higher gamma radiation fields.

Detector 222 may be a Sodium Iodide (NaI) low energy isotopic detector. Detector 222 may also be thallium doped and may be a Lanthanum Bromide ($LaBr_3$) scintillation detector. Detector 222 may serve as a gamma detector for analysis of primary radionuclides associated with irradiated fuels or activated materials. These may include Cesium-137 ($^{137}$Cs), Europium-154 ($^{154}$Eu), Europium-152 ($^{152}$Eu) Cobalt-60 ($^{60}$Co), $^{239}$Pu, $^{235}$U, as well as Uranium-238 ($^{238}$U), and other primary activation and fission products.

Detector 232 may be a Cadmium Zinc Telluride (CZT) high activity isotopic detector. Detector 232 may be used for high-level isotopic measurements (such as greater than 2 R/hr). A CZT detector provides reasonable resolution and is less sensitive at the lower gamma-ray energies than the NaI (Tl) or $LaBr_3$ detectors, for example, for those energies below 1.5 MeV. CZT detectors may provide good resolution for many long-lived radionuclides and may also be used for the detection and quantification of irradiated fuel materials and activation products in a number of environments.

Other types of detectors may be used as a detector in the alternative, or in addition to the spectrometers discussed herein. As previously mentioned, another type of spectrometer suitable for use may include a $LaBr_3$ detector. One advantage of using a $LaBr_3$ detector is that it may have a greater energy resolution capability. For example, a $LaBr_3$ detector may be able to resolve gamma rays that have energies only 10-20 keV apart rather than combining them into a single energy group when creating the spectrum.

Detector 234 may be a Compensated Geiger-Mueller (GM) detector for gross gamma activity. Such a GM detector may have a sensitivity range from just a few uR/hr to about 1000 R/hr. Data resulting from detecting gross gamma activity may be useful in determining the depths of the radiation material while data from the other detector types may be more useful in providing an isotopic characterization of the waste. In other words, taking incremental measurements to detect gross gamma activity may give measurements that either increase or decrease in intensity as the multi-detector probe 200 moves up and down, indicating a depth of the material into the soil or buried waste container in relation to the multi-detector probe 200. In an embodiment where multiple multi-detector probes may be used to obtain measurements around an area of the environment, multiple sets of measurement data may be used to provide an even more accurate estimation of the location of the radionuclide sources within the buried waste container or its surrounding environment. For example, data from a detector from one multi-detector probe may be of a strong intensity while data from a detector from of the same detector type from another multi-detector probe may be of a lesser intensity. These multiple sets of data at a similar position down the measurement hole may be used in a geometric calculation to create a multi-dimensional representation of the contents, location, and intensity of radionuclides within the measured environment.

Multi-detector probe 200 may be connected to a computer to send measurement data for storage, processing, and integration for a highly automated and integrated characterization system as illustrated in FIG. 1. Although a specific arrangement of detectors for multi-probe system 200 has been described herein and depicted in FIG. 2, one skilled in the art would recognize that each detector compartment 220, 230, 240 may have more or fewer detectors than the embodiment illustrated by FIG. 2. Additionally, more or fewer detector compartments may be present in multi-detector probe 200 than the three illustrated by FIG. 2.

FIG. 3 illustrates a multi-detector probe assembly 300 according to an embodiment of the present invention. Multi-detector probe assembly 300 includes detector compartments 310, 320, and 330. Detector compartments may include detectors 312, 322, and 332, each of which may include one or more detectors. Shielding 340, 350, 360, and 370 may be located near the upper and lower edges of the detectors 312, 322, and 332 defining the detector compartments 310, 320, and 330. Thru holes 345, 355, 365 may be formed through their respective shields 340, 350, 360 to permit instrument leads to extend to and from the detectors 310, 320, and 330. An attachment device 385, such as an eye bolt, may be located at the upper region of multi-detector probe assembly 300 to connect with one or more cables used to lower multi-detector probe 300 into the environment where the test measurements for the characterization of radionuclides in the environment may occur.

In operation, the multi-detector probe assembly 300 may be placed into the environment where radiation detection and characterization is desired. For example, a tube may be driven into the ground around an area where a buried waste container is located. The tube may be substantially vertical as it extends through the soil. The multi-detector probe assembly 300 may be configured to fit within the tube in order to be extended down the hole to make measurements in an environment, such as around or near the buried waste container.

A protective casing may be placed around the components including the detectors and instrument leads. The protective casing may include a hard casing such as aluminum or steel. The protective casing may also include a more flexible sheath such as plastic shrink wrap. A flexible protective sheath may also include a material such as polyvinyl chloride (PVC). As is illustrated by FIG. 3, a hard case is used for detector compartments 310, 330 to protect their respective detectors 312, 332. FIG. 3 also illustrates that the detector compartment 320 has a flexible sheath cover protecting detector 322. Cable 380, such as aircraft cable, may connect detector compartments 310 and 320.

Thus, in FIG. 3, the multi-detector probe assembly 300 is partially flexible in that it has a flexible middle section with hard casing on the two ends. Alternatively, an assembly may be used with a complete hard case divided into compartments by shielding. Shielding may be integrally formed with the hard case. Alternatively still, a completely flexible assembly may be used with a flexible protective sheath over the entirety of the detectors and other electronics. Flexible assemblies may provide lesser protection of the electronics, but may be better suited to fit down a tube that is not completely vertical or linear when driven into the ground. The flexible protective sheath may allow the assembly to be more flexible to follow the contours of the tube to get to the points of measurement.

The size of the multi-detector probe assembly 300 may depend on the size of the detectors themselves, and the size of the tube that the multi-detector probe assembly 300 will be required to fit through. Changing the size of the detector may affect its efficiency in making the measurements. However, increasing the size of the detectors to be more efficient may require more effort in driving a required larger tube into the ground for the multi-detector probe to fit through.

For example, multi-detector probe assembly 300 may be used in a down-hole environment to detect the presence of hazardous materials or activities in a buried radioactive waste site. These hazardous or contaminated environments may require investigation and characterization during remediation. The multi-detector probe may be placed down a tube driven into the ground around an exterior location of a buried waste container. Measurements may be taken up and down the tube, including at increments such as every 1 ft.

Individual detectors of a multi-probe detector may not be in the exact same spatial location at any given time, as there may be multiple detector compartments with different field of views. Depending on the size of the detectors used, the top detector and bottom detector may be approximately a couple of feet apart. Although the detectors of the multi-detector probe assembly 300 may be configured to substantially concurrently measure a variety of radiation sources, the detection fields of the various detectors may not be spatially the same as that of the other detectors in the probe. However, as the detector may be incrementally positioned at depths up and down a down-hole environment, measurements for different detectors begin to overlap and a full coverage of measurements of the down-hole environment is created. These measurements may be used to compare and integrate with other sets of data from the different detectors of one or more additional multi-detector probes.

Figure 4:
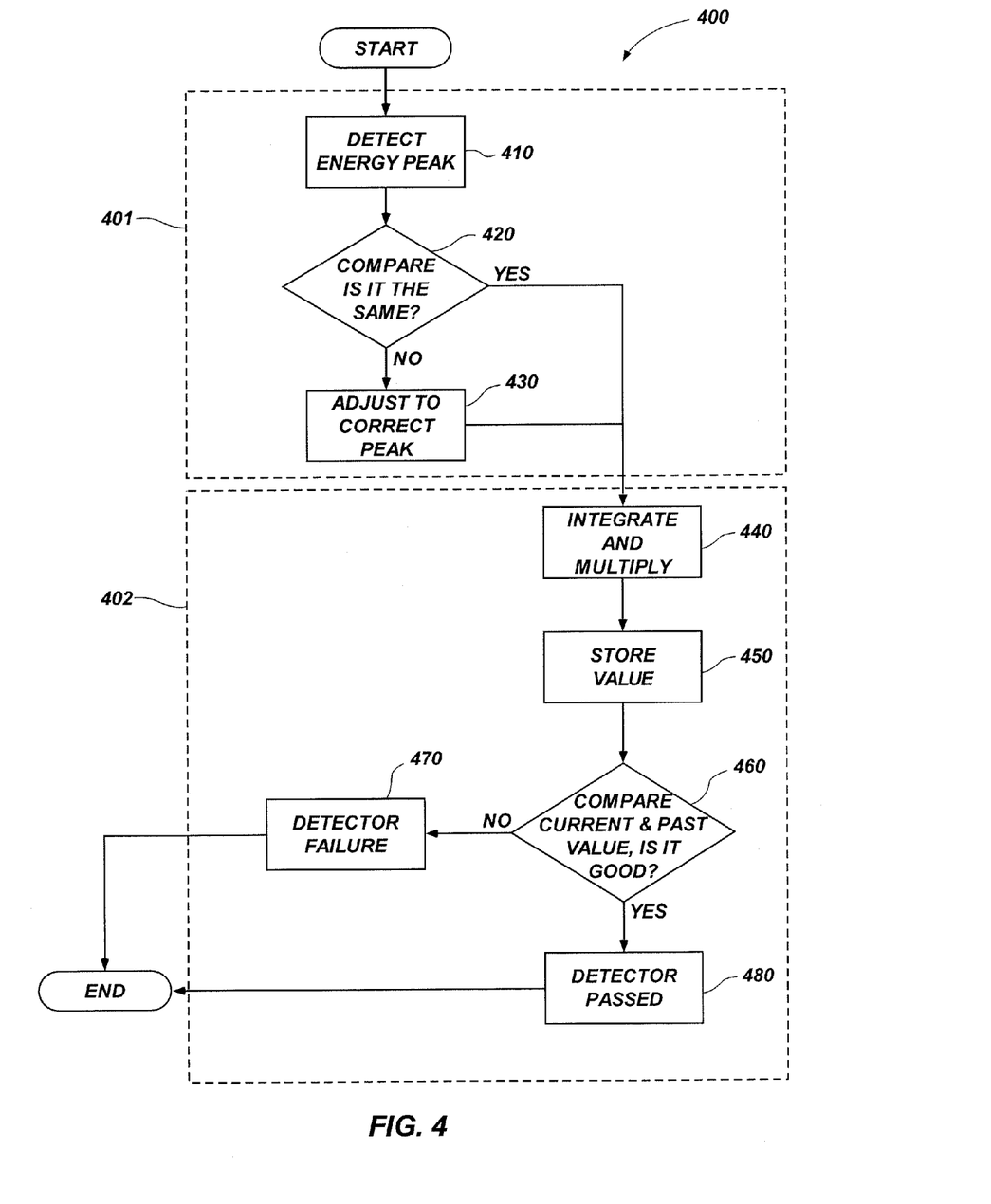
FIG. 4 illustrates a flowchart for an automated calibration function of a multi-detector probe in a radiological characterization system according to an embodiment of the present invention.

FIG. 4 illustrates a flowchart 400 for an automated calibration function of a multi-detector probe in a radiological characterization system according to an embodiment of the present invention. The calibration function may be initially set up by placing a known material at a known distance from the detector being calibrated. This may be performed on site by a field technician who may have limited training. The automated calibration function may have two sub-functions: an energy calibration 401, and an activity test calibration 402.

During the energy calibration 401, at act 410 the energy peak of the known material may be detected. At act 420, the energy peak detected by the detector is compared with the energy peak known to be associated with the known material. For example, if using Cesium-137 for calibration, the peak should occur at the known energy peak of approximately 661 keV. If the detected energy peak from act 410 matches the expected known energy peak during act 420, then no adjustment may be needed and the activity test calibration 402 may begin. If the detected energy peak from act 410 does not match the expected known energy peak during act 420, then the software will adjust the energy calibration in the detector to move the peak to the correct energy at act 430, or in other words, to adjust the detector to produce the known activity from the known material.

During activity test calibration 402, the detector is tested for operability rather than for making calibration adjustments. At act 440, the calibration routine tracks how much activity is in the peak by integrating the area under the energy peak detected in act 410 and multiplies that number by the number of counts, or photons, in the peak. This number should stay relatively stable over time as the detectors are re-calibrated and tested. At act 450, the value from act 440 is stored in a table of a computer-readable medium for future use in a later re-calibration or detector test in order to compare current performance of the detector with past performance of the same detector. At act 460, the current value measured and calculated by act 440 is compared with past performance values stored during previous tests and calibrations. If there is a significant deviation from the stored past performance values of the detector, then activity has not been stable over time and detector failure is indicated at act 470. If there has not been a significant deviation from the recorded past performance of the detector, then activity has been stable over time, and it is indicated that the detector successfully passed its calibration check at act 480.

Figure 5:
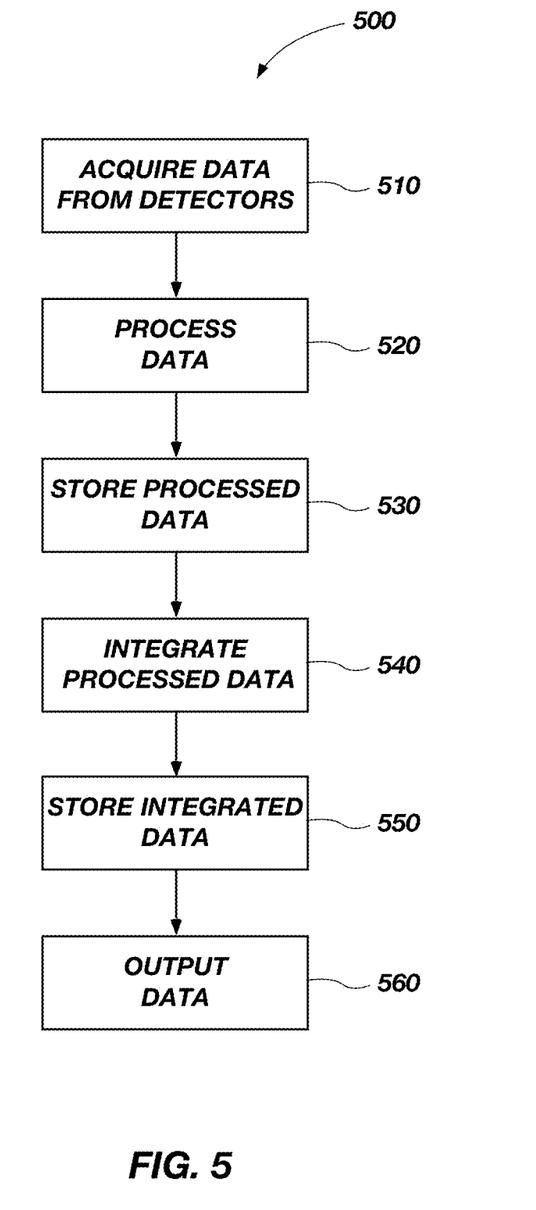
FIG. 5 illustrates a flowchart of data flow from data acquisition to data output of a radiological characterization system according to an embodiment of the present invention.

FIG. 5 illustrates a flowchart 500 of data flow from data acquisition to data output of a radiological characterization system according to an embodiment of the present invention. At act 510, data is acquired from the individual detectors of a multi-detector probe. The data may be received substantially concurrently from each of the detectors within the multi-detector probe. This raw data may essentially be a series of analog pulses caused by the detectors interaction with gamma or neutron activity representing a variety of radioactive sources depending on the type of detector producing the pulse as discussed with respect to FIGS. 1-3. At act 520, data is processed. Processing data may include converting the raw data into digital data used by the computer to digitally represent actual or estimated activity seen by the detectors. Acts 510 and 520 may be performed by analyzers or pulse counters as previously discussed. For example, control hardware on the analyzers and pulse counters may be designed to count pulses and/or categorize the pulses from detectors into bins to form a spectrum. Data acquisition may be accomplished by the hardware (e.g., analyzers and pulse counters), and software that queries the hardware. Thus, data is pulled from the hardware and goes into the processing and analysis. Once the acquisition hardware is started, it may run on its own with embedded firmware to control it.

At act 530, processed data may be stored on a computer-readable medium of the computer receiving the data. The processed data may also be stored on a computer-readable medium external to the computer, such as on an external hard drive for redundant back up storage of the data. At act 540, processed data may be integrated, or combined, to provide further analysis capabilities. Prior to act 540, each set of data from each detector may have been processed and analyzed as if data from the other detectors did not exist. During act 540 calculations are made to combine the data from multiple detectors of a common probe, and from a plurality of multi-detector probes spaced around the measured environment. This may form a more solid calculation or opinion as to the contents or activity of radionuclides in the measured environment. For example, at act 540, data may be combined from a single type of detector taken from a plurality of multi-detector probes at different locations around the buried waste container to calculate the location of a radionuclide source spatially within the buried waste container. This may be accomplished by assuming an attenuation coefficient (e.g., soil) related to the density of the buried waste container and other debris contained therein, and then by calculating radiation attenuation (e.g., exponentially). This may be done for the plurality of locations around the buried waste container until the calculated activities of the source match each other by adjusting the distance from the detector to the source for each of the different locations where a plurality of multi-detector probes were located. These measurements from the plurality of multi-detector probes may have been made substantially concurrently around the different locations of the buried waste container. These calculated distances for each of the plurality of multi-detector probes may be related because as the source is moved away from one side of the buried waste container, it moves closer to detectors on the other side of the buried waste container and vice versa. In addition to locating a source location within the buried waste container, act 540 may use other information received from the different detector types to give further information regarding the types and activity of radionuclides. For example, data may indicate that the source location specifically contains a source material, such as uranium. Data from a neutron detector taken substantially concurrently may further indicate there are neutrons present—indicating the presence of fuel as well. As each of these different detector types were measured substantially concurrently and at known positions, source location as well as identification of source type and activity may be simultaneously possible.

Thus, act 540 may be thought of as a data fusion process. Multiple measurements may be combined for a single type of detector from a plurality of multi-detector probes around a measured environment. This data may also be combined with measurements from other types of detectors to confirm or refute an initial analysis that may come from using a single detector type. Further, the integrated data from the plurality of multi-detector probes allows for shielding from objects within the environment or VPU to be incorporated into the analysis. For example, strong measurements taken by one multi-detector probe at one location around the environment along with weaker measurements at another location around the same environment by a different multi-detector probe may indicate the presence of an object within the environment that is shielding one or more of the multi-detector probes.

At act 550, the integrated data may be stored on a computer-readable medium of the computer. The integrated data may also be stored on a computer-readable medium external to the computer, such as on an external hard drive for redundant back up storage of the data.

At act 560, data upon which remediation and safety decisions may be based may be output to be viewed by a field technician. Forms of the output may include displaying representations of the data on a display connected to computer 180, or printed from a printer. For example, a multi-dimensional plot may be displayed or printed to be viewed by the field technician. Examples of such plots may include a threedimensional model of the buried waste container or a tomograph representing the contents and activity of container. Additionally, output may include creating an inventory of isotopic contents of the environment. Such an inventory may include outputting tables and numbers representing vertical or horizontal contents and activity of the buried waste container or other environment to be measured and characterized.

During the data analysis by the software, a complicated spectrum may be analyzed to provide data on individual spectrum components or nuclides within the spectrum. Some sources have distinctive signatures that have to be present and in a certain ratio to determine that the source exists in the environment and the quantity present. Once detectors from the multi-detector probes are calibrated, the software may evaluate both the peak area and the background on the sides of the peak to assess the activity present. With that assessment, the radionuclide activity present in the container may be measured.

For example, at act 520, a $^{60}$Co source may produce a gamma ray detected by the detector and received at an analyzer for processing. $^{60}$Co is known to produce a gamma ray spectrum with two distinct gamma ray lines. One is approximately located at 1170 keV and the other at approximately 1330 keV. Thus, if there exist two energy peaks detected at about 1170 and 1330 keV, the analysis software may determine that $^{60}$Co is present at the location where the detector was when it made that measurement. Further use of measurements for multiple gamma ray lines may be used to assess whether mass attenuation is present, which has been uncompensated for, or to correct for differential density effects inside the buried waste container. For example, if the higher energy gamma ray lines are stronger than they are expected to be, the system may correct for the higher attenuation inside the buried waste container. In other words, if there is a dense object, or else an air gap in the buried waste container, by comparing the difference in what the expected or assumed attenuation is for a known density with the measured attenuation, the system may correct the measured activity data based on the determination of there being such an object, or a gap within the buried waste container. Such a determination may be performed by gamma ray lines detected by detectors in a single multi-detector probe or through integration of measurements from a plurality of multi-detector probes located around the buried waste container.

The data received by detectors and the subsequent integrated analysis and processing may assist field operators in making immediate remediation decisions regarding buried hazardous materials. For example, data regarding the gross gamma radiation and isotopic analysis may define whether a buried waste container should be removed from the ground without special shielding requirements. One such requirement may be set at containers with less than 200 mRem/hr at an outer surface of the container. Data may also be sufficient to also define the grams of fissile material radionuclide content so that the hazardous material can be properly staged, stored and subsequently processed without undue handling and storage requirements. Thus, the multi-detector probe assembly, system, and the integrated software for the system, and related methods permit field operators with limited training to use the detection system to calibrate the system, perform the measurements, and read and understand the processed and analyzed data to make immediate remediation decisions. The assembly, system, integrated software, and related methods also provides for redundant storage in case of data loss as well as to ensure subsequent assessment and review.

Figure 6:
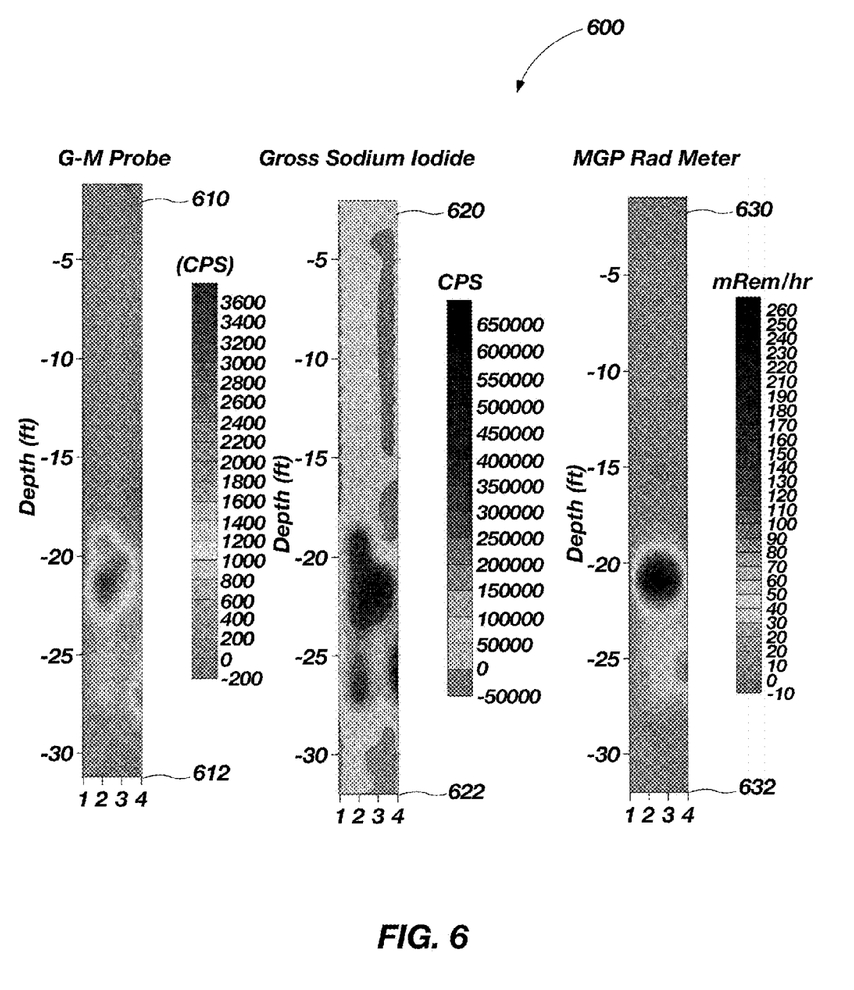
FIG. 6 illustrates an output plot representation of a detected radiation field inside of a buried waste container according to one embodiment of the present invention.

FIG. 6 illustrates an output plot representation 600 of a detected radiation field inside of a buried waste container according to one embodiment of the present invention. This is an example of a pseudo 3D or a 2.5D control representation of the radiation field inside a buried waste container. In this example, the buried waste container is a VPU. Each column 610, 620, 630 may be thought of as the same VPU but represented by detection of different radiation types. For example, column 610 represents the activity within the VPU detected from a GM detector. Column 620 represents the activity within the same VPU as substantially concurrently detected by a NaI detector. Column 630 represents the activity within the same VPU as substantially concurrently detected by a radiation meter. The x-axis 612, 622, 632 of each of columns 610, 620, and 630 represent measurements from four different multi-detector probes taken at different locations around the exterior of the VPU through a down-hole environment. The colors or shades within the columns 610, 620, and 630 represent the activity values calculated as given by the legends for each plot. Measurement data from neutron detectors is not shown because such detectors did not measure any neutron activity in this particular VPU.

Such a characterization may dictate procedures taken during remediation that may improve efficiency and safety, reducing cost and risk. If the strength of the detected radiation field is above a certain level, then certain protections need to be in place. If field operators know what types of waste may be present prior to excavation, then it may dictate what precautions they use. The best solution may be to not excavate and leave the content there for several years for it to cool down before removal and remediation.

While the invention is susceptible to various modifications and implementation in alternative forms, specific embodiments have been shown by way of non-limiting example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method for detecting multiple forms of radioactive activity in an environment, the method comprising:
   detecting a plurality of different radiation types in a down-hole environment with a multiple-detector probe including a first detector configured to detect a first radiation type, and a second detector configured to detect a second radiation type that is different than the first radiation type, wherein detecting a plurality of radiation types includes detecting radiation from contents of a buried waste container in the down-hole environment;
   sending substantially concurrent measurement data from the first detector and the second detector of the multiple-detector probe to a computer;
   calculating a radiation source location in the down-hole environment and source type based on the measurement data detected by the first detector and the second detector; and
   taking measurement data for the plurality of radiation types from at least one other multiple-detector probe at another different location relative to the buried waste container within the down-hole environment.

2. The method of claim 1, wherein calculating a radiation source location is based at least in part on measurement data from the multiple-detector probe located in a first hole and measurement data from the at least one other multiple-detector probe located in at least one other hole of the down-hole environment.

3. The method of claim 1, further comprising processing detected measurement data to create a spectrum of radiation energies emitted from one or more radiation sources contained within the down-hole environment.

4. The method of claim 1, wherein the taking the measurement data from the multiple-detector probe located in a first hole and taking the measurement data from the at least one other multiple-detector probe located in at least one other hole of the down-hole environment occurs at least substantially simultaneously at a similar depth within their respective hole.

5. A method for detecting multiple forms of radioactive activity in an environment, the method comprising:
   detecting a plurality of radiation types in an environment with a probe including a plurality of detectors;
   sending substantially concurrent measurement data from the plurality of detectors of the probe to a computer;
   taking measurement data for the plurality of radiation types from at least one other probe at another different location relative to a buried waste container within the environment; and
   combining a spectral analysis of source type with a calculated estimate of radiation source location based at least in part on measurements detected by the probe and the at least one other probe.

6. A method for detecting multiple forms of radioactive activity in an environment, the method comprising:
   detecting a plurality of radiation types in an environment with a probe including a plurality of detectors;
   transmitting substantially concurrent measurement data from the plurality of detectors of the probe to a computer;
   taking measurement data for the plurality of radiation types from at least one other probe at another different location relative to a buried waste container within the environment; and
   compensating for differential density in the buried waste container by comparing strength of multiple gamma ray lines with expected strengths of gamma rays from known sources.

7. A method for detecting multiple forms of radioactive activity in an environment, the method comprising:
   detecting a plurality of different radiation types in a down-hole environment with a multiple-detector probe including a first detector configured to detect a first radiation type, and a second detector configured to detect a second radiation type that is different than the first radiation type;
   sending substantially concurrent measurement data from the plurality of detectors of the multiple-detector probe to a computer;
   taking measurement data for the plurality of different radiation types from at least one other multiple-detector probe at another different location relative to a buried waste container within the environment; and
   compensating for differential density in the buried waste container by comparing strength of multiple gamma ray lines with expected strengths of gamma rays from known sources.

8. The method of claim 7, wherein detecting a plurality of different radiation types includes detecting radiation from contents of a buried waste container in the down-hole environment.

9. The method of claim 7, wherein detecting a plurality of different radiation types comprises:
   detecting one of gross gamma activity, isotopic activity, or neutron activity for the first radiation type; and
   detecting another of gross gamma activity, isotopic activity, or neutron activity for the second radiation type.

10. The method of claim 8, further comprising calculating radiation source location in the down-hole environment and source type based on the measurement data detected by the plurality of detectors.

11. The method of claim 8, wherein detecting a plurality of radiation types comprises taking measurement data using the multiple-detector probe at incremental depth positions in the down-hole environment.

12. A method for detecting multiple forms of radioactive activity in an environment, the method comprising:
   detective a plurality of different radiation types in a down-hole environment with a multiple-detector probe including a first detector configured to detect a first radiation type, and a second detector configured to detect a second radiation type that is different than the first radiation type;
   sending substantially concurrent measurement data from the plurality of detectors of the multiple-detector probe to a computer;
   taking measurement data for the plurality of different radiation types from at least one other multiple-detector probe at another different location relative to a buried waste container within the environment; and
   combining a spectral analysis of source type with a calculated estimate of radiation source location based at least in part on measurements detected by the multiple-detector probe and the at least one other multiple-detector probe.

13. The method of claim 12, wherein detecting a plurality of different radiation types in a down-hole environment with a multiple-detector probe includes generating an energy spectrum of measured gamma pulse heights from pulses generated by at least one detector of the plurality of detectors.

14. The method of claim 12, wherein detecting a plurality of different radiation types in a down-hole environment with a multiple-detector probe includes counting events of neutron pulse activity generated by at least one detector of the plurality of detectors.

15. The method of claim 12, wherein the first detector and second detector are two different detectors selected from the group consisting of an isotopic gamma-ray detector, a gross gamma radiation detector, and a neutron detector.

16. The method of claim 15, wherein the two different detectors are selected from the group consisting of a $BF_3$ neutron detector, $^3$He neutron detector, NaI isotopic detector, CZT isotopic detector, $LaBr_3$ isotopic detector, and a Geiger-Mueller detector.

* * * * *